Sept. 9, 1958 F. E. HOFFMANNS 2,851,262
UNIT WEIGHT MECHANISM FOR WEIGHING SCALES
Filed Oct. 3, 1955 7 Sheets-Sheet 1
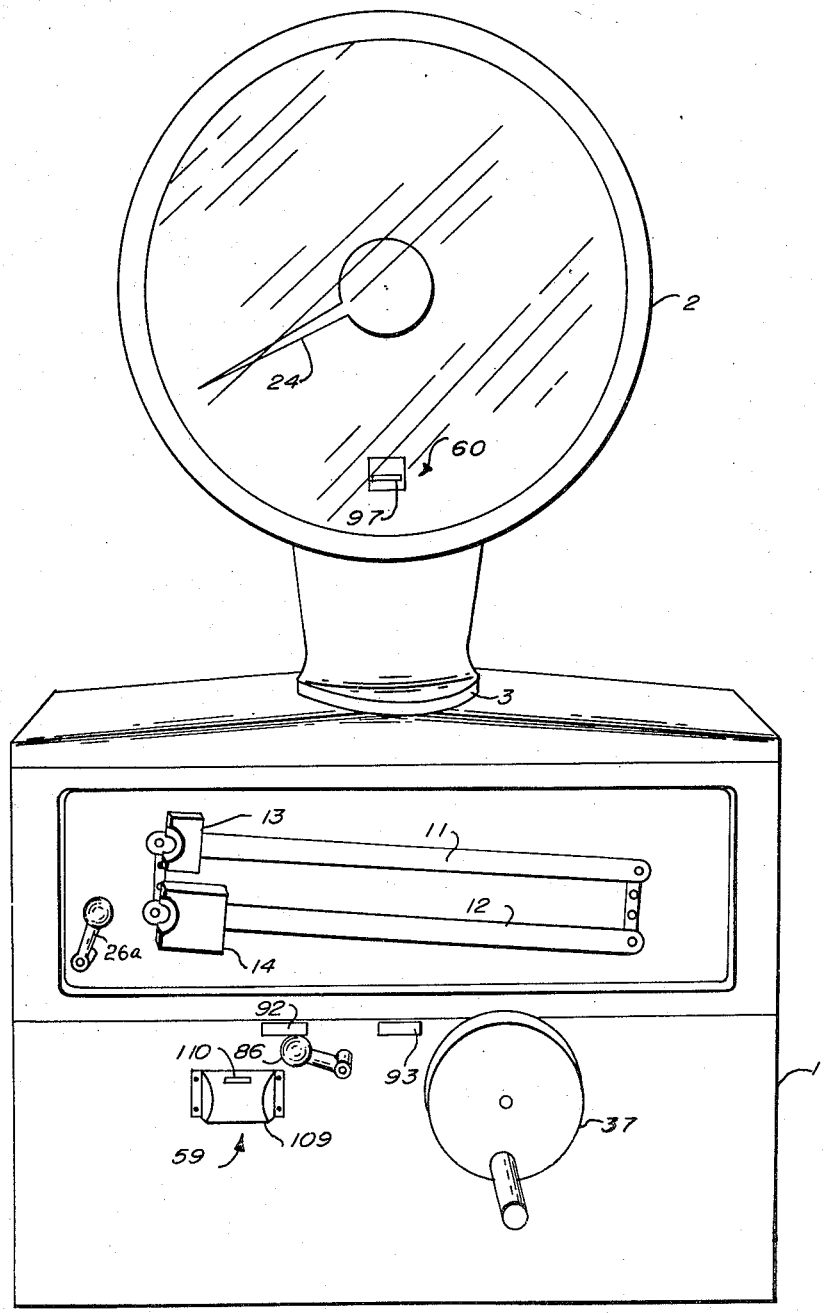
Fig. I
INVENTOR.
FREDERIC E. HOFFMANNS
BY
Marshall, Marshall & Geasting
ATTORNEYS

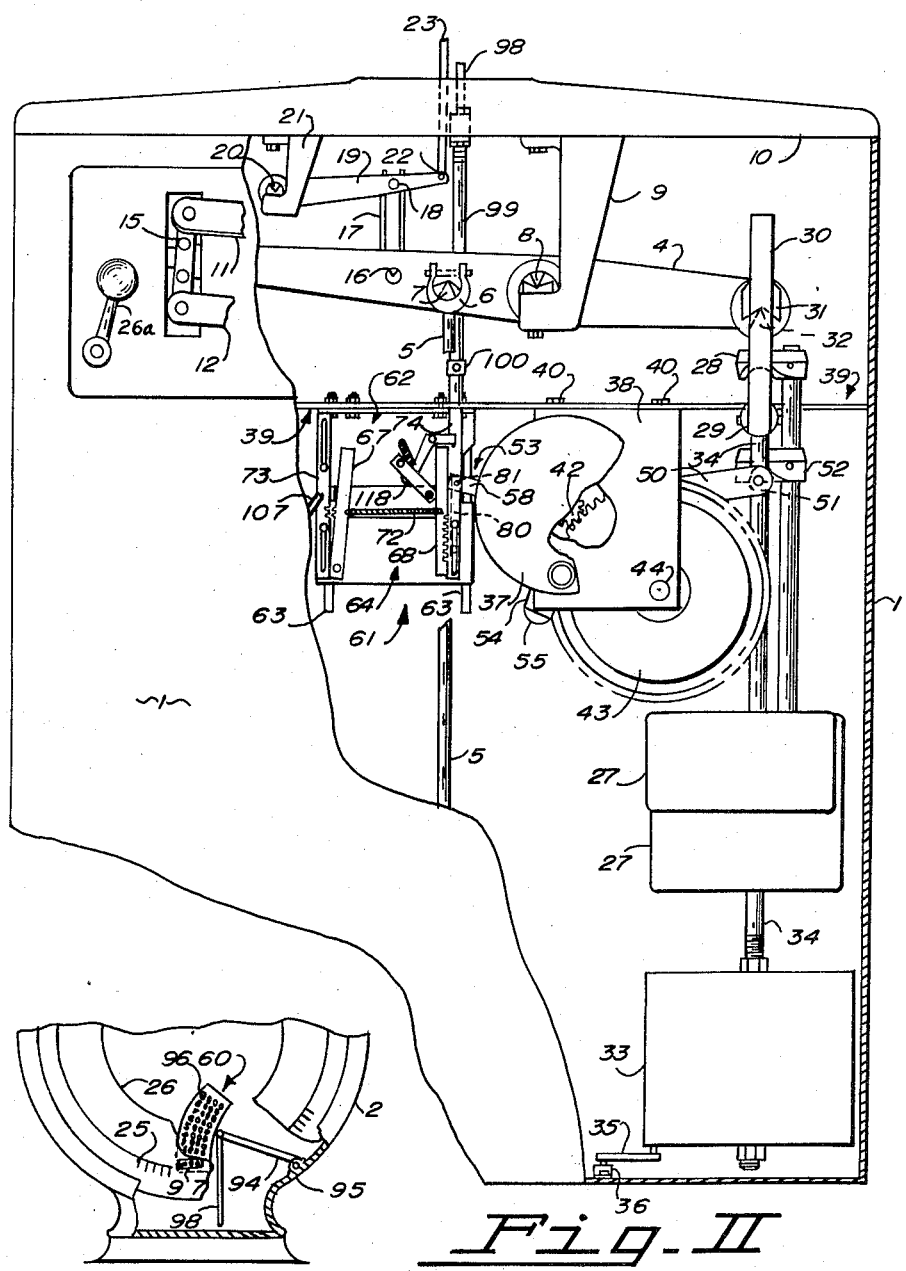

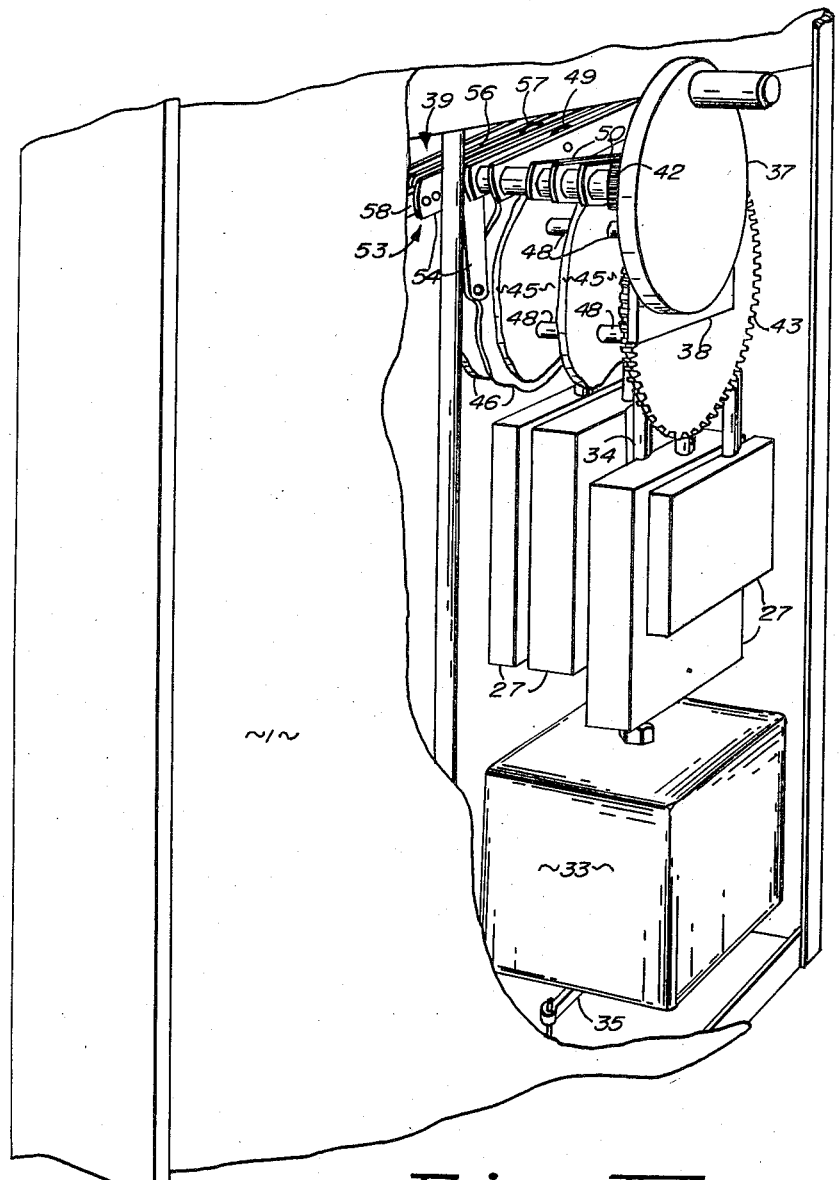
Fig. IV

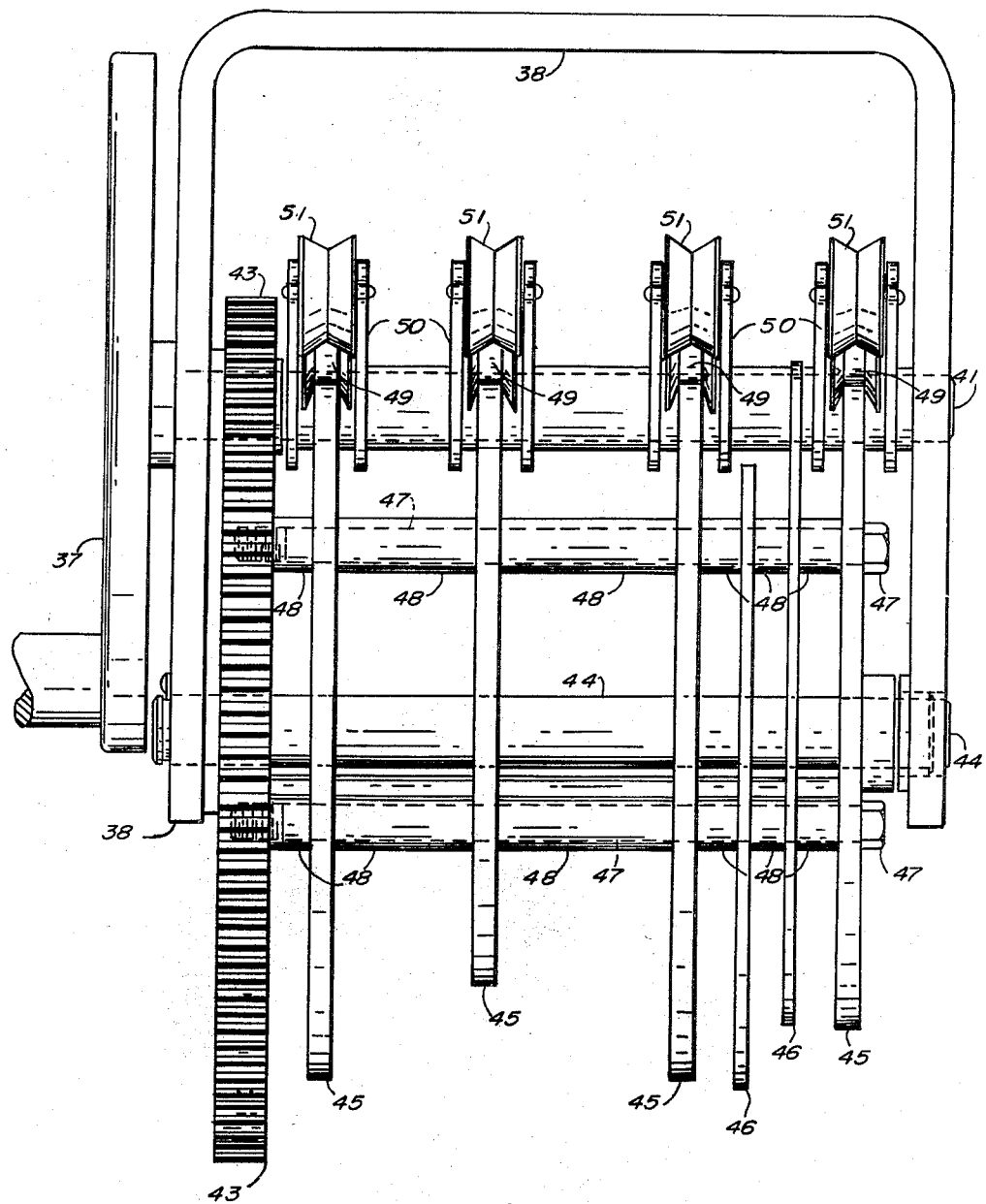
Fig. V
INVENTOR.
FREDERIC E. HOFFMANNS

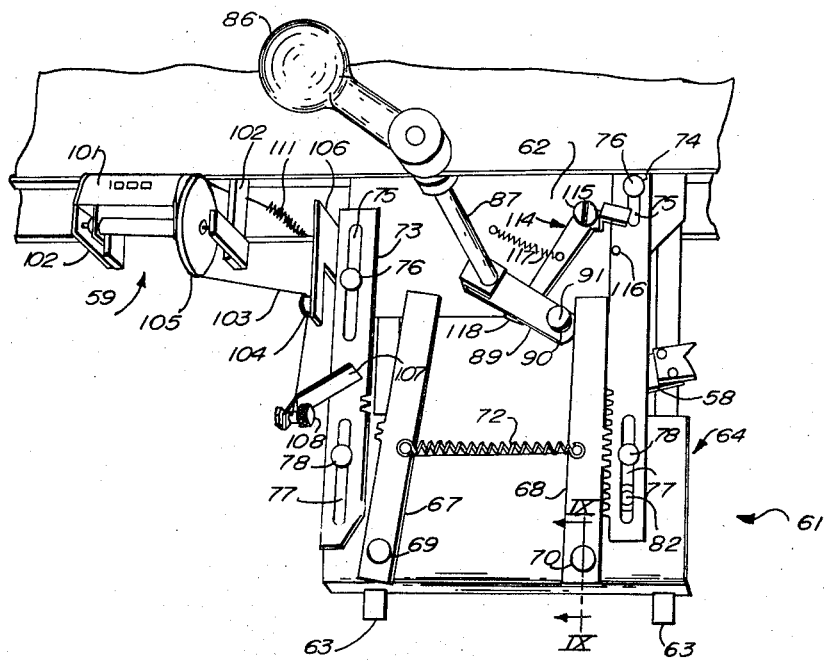
Fig. VI
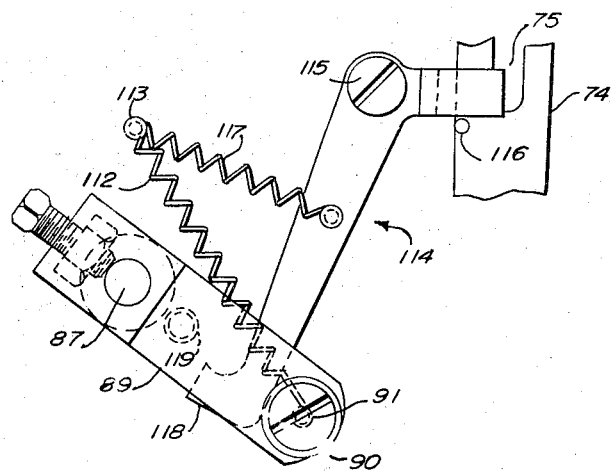
Fig. VII

Sept. 9, 1958   F. E. HOFFMANNS   2,851,262
UNIT WEIGHT MECHANISM FOR WEIGHING SCALES
Filed Oct. 3, 1955   7 Sheets-Sheet 6
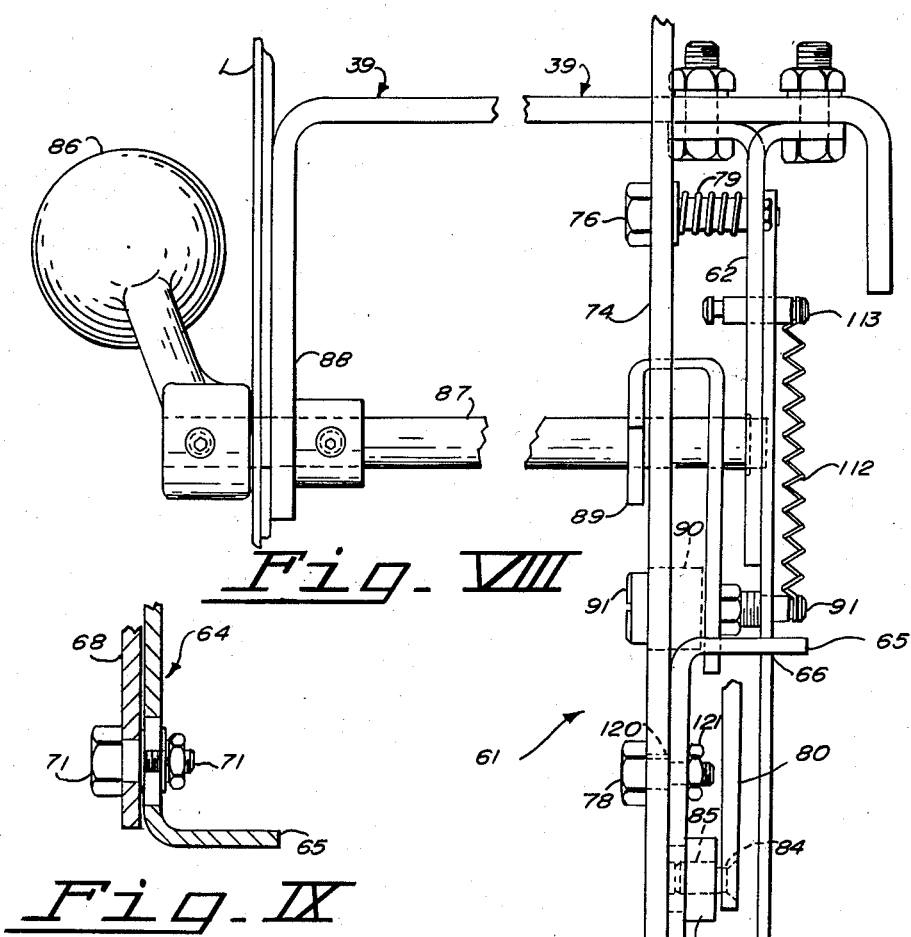
INVENTOR.
FREDERIC E. HOFFMANNS
BY
Marshall, Marshall & Yeasting
ATTORNEYS

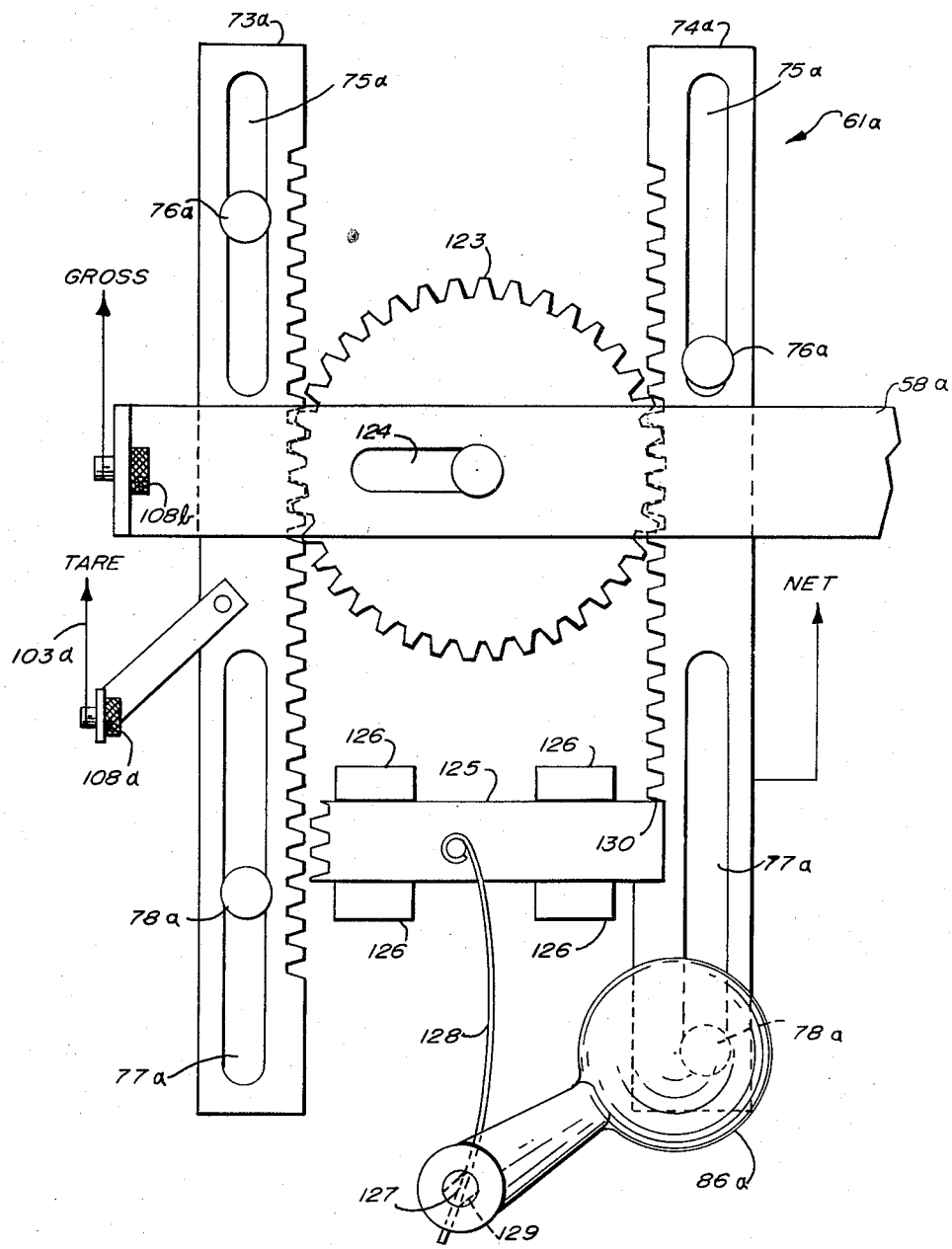

United States Patent Office 2,851,262
Patented Sept. 9, 1958

2,851,262

UNIT WEIGHT MECHANISM FOR WEIGHING SCALES

Frederic E. Hoffmanns, Toledo, Ohio, assignor, by mesne assignments, to Toledo Scale Corporation, Toledo, Ohio, a corporation of Ohio Application October 3, 1955, Serial No. 538,094

14 Claims. (Cl. 265—43)

This invention relates generally to weighing scales, and more particularly to scales which are provided with manually applied "unit weights" for increasing the load offsetting capacity.

Many weighing scales are constructed which incorporate additional so-called "unit weights" for increasing the load offsetting capacity of the scale without decreasing the sensitivity of indication given by the main scale indicator. This is usually accomplished by means of manually positionable unit weights which are placed on the weighing scale mechanism, one at a time, and each of which increases the capacity of the scale by some fixed amount, e. g., 500 or 1000 pounds. In scales so equipped, the unit weights may counterbalance as much as four-fifths or more of the total weighing capacity of the scale, the remaining one-fifth being counterbalanced by ordinary automatic load counterbalancing mechanism and indicated by the regular scale indicator attached thereto. The indication of the increased weighing capacity of the scale, that achieved by the unit weights, may be in the form of small flags which state the amount to be added to the indication to give the total weight of the load on the scale. Unit weight operating mechanism is manipulated to place one or more unit weights into cooperative relation with the automatic load counterbalancing mechanism when a load is on the platform which exceeds the automatic counterbalancing capacity as indicated by the chart.

Heretofore, such unit weights were used to offset net load only, any tare being offset by the usual poise weights on an ordinary tare beam. This method, however, is not satisfactory when the tare weight is large relative to the net weight, e. g., a loaded tow-motor truck which may have a tare weight in excess of the capacity of the tare beam and its poise weights.

The principal object of this invention is to provide, in a weighing scale, means for permitting the selective use of ordinary unit weights either to offset tare or to offset net load or both.

It is also an object of the invention to provide, in a weighing scale having unit weights for increasing the load offsetting capacity of the scale and unit weight operating mechanism, a pair of unit weight indicating devices selectively coupled to the unit weight operating mechanism, one of the devices indicating the amount of tare offset by unit weights and the other of the devices indicating the amount of net load offset by further unit weights.

Another object of the invention is to provide, in a weighing scale, a pair of unit weight indicating devices selectively coupled to unit weight operating mechanism and apparatus for permitting the optional use of the devices either to indicate on one of the devices the amount of tare offset by unit weights and on the other of the devices the amount of net load offset by further unit weights or to indicate on one of the devices the gross amount of tare and net load offset by unit weights and on the other of the devices the amount of net load offset by unit weights.

A further object of the invention is to provide, in a weighing scale, apparatus for permitting the selective use of unit weights either to offset tare or to offset net load or both and means for preventing unit weights from being removed from tare offsetting use until all unit weights are removed from net load offsetting use.

A still further object of the invention is to provide, in a weighing scale, apparatus including a conditioning lever for permitting the selective use of unit weights either to offset tare or to offset net load or both and means for allowing all unit weights to be removed from offsetting use regardless of the position of the conditioning lever.

According to the general features of the invention, there is provided a pair of unit weight indicating devices selectively coupled to the usual unit weight operating mechanism of a weighing scale. The devices are especially useful in connection with the weighing of loaded tow-motor trucks or other objects having a tare weight which is large relative to net weight.

In operation, for example, if an empty truck weighs 2400 pounds, the operator may use unit weights to tare off 2000 pounds and the regular poise weights to tare off the remaining 400 pounds. One of the new unit weight indicating devices will then indicate 2000 pounds tare offset by unit weights. The operator then may manipulate a conditioning lever on the front of the weighing scale, whereupon he may offset 7000 pounds of net load by the remaining unit weights in the usual manner. In addition to the part of the net load counterbalanced by the usual automatic load counterbalancing mechanism, such as springs or pendulums, the two unit weight indicating devices will then read:

"Add 2000 lb." to the tare shown on the tare beam.
"Add 7000 lb." to the net load shown on the dial.

Other objects, features and advantages of the invention will become apparent to one skilled in the art from the following description of the embodiments illustrated in the accompanying drawings, wherein:

Figure I is a perspective view of the upper part of a unit weight cabinet and the dial housing of a weighing scale embodying the invention;

Figure II is a front elevational view of the unit weight cabinet shown in Figure I, parts of the cabinet being broken away and parts being shown in section to reveal the interior;

Figure III is a reduced front elevational view of the dial housing shown in Figure I, parts of the housing being broken away;

Figure IV is a perspective view of a portion of the interior of the unit weight cabinet showing unit weights and their operating mechanism;

Figure V is an enlarged side elevational view of the unit weight operating mechanism shown in Figures II and IV;

Figure VI is an enlarged perspective view of part of the interior of the unit weight cabinet shown in Figure II;

Figure VII is an enlarged front elevational view of a fragment of the mechanism shown in Figure VI;

Figure VIII is an enlarged end elevational view of the mechanism shown in Figure VI;

Figure IX is an enlarged vertical sectional view taken on line IX—IX of Figure VI looking in the direction indicated by the arrows;

Figure X is an enlarged fragmentary elevational view of a modified form of the apparatus shown in Figure VIII;

Figure XI is a diagrammatic view of a modified form of the apparatus shown in Figure VI.

These specific drawings and the accompanying description are intended merely to illustrate the invention but not to limit its scope.

A weighing scale embodying the invention includes a frame in the form of a cabinet 1 surmounted by a dial housing 2 erected on a housing base 3. A load receiving mechanism (not shown) is provided which includes the usual load supporting levers and load receiving platform. The load moment is transmitted to a tare beam lever 4 through a suitable stirrup on the nose of the load supporting levers through a rod 5, suspended by means of a stirrup 6 from laterally extending pivots 7 in the tare beam lever 4, which, by means of fulcrum pivots 8, is rockably mounted upon a fulcrum stand 9 fixedly hung from a ceiling 10 in the interior of the cabinet 1. The tare beam lever 4 carries tare beams 11 and 12, with their poises 13 and 14, bolted to projecting arms 15 which beams and cooperating poises serve to offset tare weights. The cabinet 1 is usually mounted adjacent the load receiving platform in such a position that the depending rod 5 is vertically positioned to engage the aforementioned stirrup in the nose of the load supporting lever system. Although an extension lever may be interposed between the nose end and the rod 5 the length of such extension lever is necessarily limited.

Load forces to be counterbalanced are transmitted from the tare beam lever 4 through a power pivot 16 and connecting linkage 17 to a load pivot 18 of a second lever 19, which, by means of fulcrum pivots 20, is rockably mounted upon a fulcrum bracket 21 fixedly hung from the ceiling 10 of the cabinet 1. The second lever 19 has a power pivot 22 engaging a bearing at the lower end of a steelyard rod 23 that extends upwardly into the dial housing 2 and is connected to automatic load counterbalancing mechanism enclosed within the dial housing 2. An indicator 24 cooperates with a series of indicia 25 marked on the exposed face of a chart 26 to indicate the weights of loads. The tare beam lever 4 may be locked when the scale is moved by an ordinary lock which is not shown but which is actuated by a lever 26a.

Auxiliary load counterbalancing mechanism is also provided in the weighing scale. This comprises a plurality of individual unit weights 27 having first hooked portions 28 which may be successively and individually hooked over a hanger bar 29 secured to the lower ends of plates 30 whose upper ends are provided with V-bearings 31 which are supported upon laterally extending pivots 32 in the tare beam 4 on the opposite side of the fulcrum point of the tare beam 4 from the connection between the rod 5 and the tare beam. The hanger bar 29 has a plurality of annular V-shaped grooves one for each of the first hooked portions 28 of the manually applied unit weights 27. For counterbalancing the dead weight of the load receiving platform and the lever system, not counterbalanced by the load counterbalancing mechanism when in initial position, a hollow chamber 33, suspended by means of a rod 34 rigidly attached to the hanger bar 29, is provided for the reception of lead or other counterbalancing material. Swinging motion, or oscillation of the chamber 33 about its suspension point on the hanger bar 29, is prevented by a check link 35 whose ends pivotally engage the chamber 33 and a fulcrum stand 36 which is mounted upon the bottom of the cabinet 1.

Unit weight operating mechanism is provided so that the unit weights 27 may be manually applied to or taken from the hanger bar 29 by manipulation of a handle 37 located on the outside of the cabinet 1. Each time the handle 37 is turned clockwise 180 degrees the capacity of the scale is increased by a fixed amount equal to the capacity of the chart 26. Although only four unit weights 27 are provided, the weights are applied in combinations to provide nine increases to the capacity of the scale, each increase equal to the capacity of the chart 26. Each time the handle 37 is turned counterclockwise 180 degrees the capacity of the scale is decreased by a fixed amount equal to the capacity of the chart 26.

The unit weight operating mechanism is hung as a unit by means of a U-shaped bracket 38 attached to a shelf 39 within the cabinet 1. Removal of nuts 40 allows the bracket 38 carrying all of the unit weight operating mechanism to be taken out of the cabinet 1. The unit weight operating mechanism includes the handle 37 fixed to a shaft 41 (Figure V) journaled in the bracket 38 and a pinion 42 also fixed to the shaft 41 which pinion cooperates with a gear 43 fixed to a shaft 44 journaled in the bracket 38. When the handle is turned and the pinion 42 drives the gear 43, lifting cams 45 (Figures IV and V) and flash drive cams 46 rigidly attached to the gear 43 by means of bolts 47 threaded into the gear 43 turn in response. The cams 45 and 46 are separated from the gear 43 and from each other by separators 48, the shaft 44 to which the gear 43 is attached passing through a hole cut in each cam.

When the lifting cams 45 are turned, their cooperating follower wheels 49 drive lifting arms 50 rotatably pivoted to the shaft 41, which arms 50 have lifting pulleys 51 attached to the ends of the arms 50 remote from the follower wheels 49. The lifting pulleys 51 cooperate with second hooked portions 52 (Figure II) of the unit weights 27 to move the first hooked portions 28 of the unit weights from or onto the hanger bar 29. The unit weights 27 are applied in combinations to provide nine increases to the capacity of the scale, each increase equal to the capacity of the chart 26 and each increase provided by a 180 degree clockwise turn of the handle 37.

As the lifting cams 45 are turned, the flash drive cams 46 are also turned to drive a follower 53 (Figures II and IV) pivoted to the shaft 41. The flash drive cams 46 are identically shaped, inversely mounted, and rigidly connected, as shown in detail in Figure V of U. S. Patent No. 2,724,585, issued to R. O. Bradley and C. H. Maurice, Jr. on November 22, 1955. The follower 53 includes an L-shaped bell crank 54 formed of two identically shaped spaced pieces pivoted side by side to the shaft 41 which bell crank 54 carries a roller 55 following one of the flash drive cams 46, and an arm 56 also formed of two identically shaped spaced pieces pivoted side by side to the shaft 41 which arm 56 carries a roller 57 following the other flash drive cam 46. The bell crank 54 and the arm 56 cross like the arms of scissors and are squeezed together like the arms of scissors by means of a compression spring (not shown) attached to a bolt joining the bell crank 54 and the arm 56 causing the bell crank and the arm to press the rollers 55 and 57 into constant yet flexible contact with their respective flash drive cams 46. A bar 58 is rigidly sandwiched between the two pieces forming the bell crank 54 and extends beyond the bell crank. This construction provides a "fail safe" positive drive for the bar 58, i. e., no return means independent of the flash drive cams 46, such as a spring return, is used. The flash drive cams 46 are shaped and positioned to positively drive the end of the bar 58 downward as unit weights are placed by the unit weight operating mechanism onto the hanger bar 29 and upward as unit weights are removed from the hanger bar.

Heretofore, the unit weights 27 were used to offset net load only, any tare being offset by the poises 13 and 14 on the tare beams 11 and 12. However, when the tare was large relative to the net weight, e. g., a loaded tow-motor truck, such limited use of the unit weights 27 was not satisfactory, since the tare weight was sometimes in excess of the capacity of the tare beams. According to the general features of the invention, there is provided a pair of unit weight indicating devices 59 and 60 (Figure I) selectively coupled to and driven by the bar 58 of the unit weight operating mechanism, one device 59 indicating the amount of tare offset by unit weights 27 and the other device 60 indicating the amount of net load offset by further unit weights.

The unit weight indicating devices 59 and 60 may be coupled to the end of the bar 58 by means, generally indicated by the reference numeral 61, in Figures II, VI and VIII illustrating the preferred embodiment of the invention and by the reference numeral 61a in Figure XI illustrating a modification of the preferred embodiment, for permitting the selective use of the unit weights 27 either to offset tare or to offset net load or both. Such means 61 includes a vertical plate 62 (Figures II, VI and VIII) that is fixedly hung from the shelf 39 in the cabinet 1 and that carries a pair of spaced and vertically positioned slide bars 63 rigidly attached thereto. The bars 63 extend well below the bottom of the plate 62 so that there is plenty of room for a slidably mounted plate or slide 64 to move up and down on the bars 63, the slide 64 being in the form of a flat-bottomed U the legs 65 of which have openings which cooperate with the bars 63 at 66. The slide 64 carries a pair of racks 67 and 68 pivotally attached to the slide at 69 and 70 respectively. The pivotal connections between the racks 67 and 68 and the slide 64 are identical and one is shown in detail in Figure IX which illustrates the bottom of the rack 68 attached to the slide 64 by means of a shoulder screw 71. As viewed in Figure VI, the left hand rack 67 is constantly urged in a clockwise direction about its pivot point 69 and the right hand rack 68 is constantly urged in a counterclockwise direction about its pivot point 70 by a coil spring 72 extending between and attached to the central portions of the racks.

The plate 62 and the slide 64 are interconnected by a second pair of racks 73 and 74 which are slidably mounted. Each of the racks 73 and 74 has an upper slot 75 cooperating with the shoulder of a shoulder screw 76 connected to the stationary plate 62 and each has a lower slot 77 cooperating with the shoulder of a shoulder screw 78 connected to the slide 64. The upper shoulder screws 76 are surrounded by coil springs 79 located between the racks and the plate, one of which springs 79 may be seen in Figure VIII urging the rack 74 away from the plate 62.

The end of the bar 58, which is driven downward by the flash drive cams 46 as unit weights 27 are placed by the unit weight operating mechanism onto the hanger bar 29 and upward as unit weights are removed from the hanger bar, is connected to the slide 64 by means of a link 80 pinned to the bar 58 at 81 (Figure II) and to the slide 64 at 82 (Figure VI). The pin connections at 81 and 82 are similar and the lower one 82 is illustrated in detail in Figure VIII which shows a ring 83 fixed to the slide 64 and a pin 84 fixed to the lower end of the link 80, the pin cooperating with an opening 85 in the ring. The slide 64 is, thus, operatively and permanently connected to the unit weight operating mechanism and positioned thereby.

The slide 64, moved up and down by the bar 58, carries the pivotally attached pair of racks 67 and 68 up and down and these racks may be selectively coupled with the slidably mounted racks 73 and 74 to drive up or down that one of the racks 73 and 74 which happens to be so coupled. The unit weight indicating device 60 is driven by the rack 74 and the unit weight indicating device 59 is driven by the rack 73, as will be hereinafter described. The pivotal racks 67 and 68 are selectively coupled to the slidable racks 73 and 74 by means including a conditioning lever 86 that is located on the outside of the cabinet 1 and that is mounted on a shaft 87 journaled in a leg 88 of the shelf 39 and in the stationary plate 62, as shown in Figure VIII. The end of the shaft 87 remote from the lever 86 carries a bracket 89 fixed thereto by means of a set screw and a nut (see Figure VII) and the bracket in turn carries a wheel 90 turning on the shoulder of a shoulder screw 91 mounted through the bracket.

The wheel 90 contacts the upper end of the pivotally mounted rack 68, as shown in Figure VI, when the conditioning lever 86 is moved to "Weigh" position indicated at 92 in Figure I. Contact of the wheel 90 with the rack 68 pivots the rack about the pivot point 70 and meshes it with the slidably mounted rack 74. The wheel 90 contacts the upper end of the pivotally mounted rack 67 when the conditioning lever 86 is moved to "Tare" position indicated at 93 in Figure I. Contact of the wheel 90 with the rack 67 pivots the rack about its pivot point 69 and meshes it with the slidably mounted rack 73.

The unit weight indicating device 60 includes an arm 94 (Figure III) pivoted at 95 in the dial housing 2. The opposite end of the arm 94 is provided with a flag 96 bearing a series of numerals which represent net weight values offset by unit weights 27. The flag 96 is positioned immediately in back of the chart 26 so that one of the series of numerals thereon is visible in an opening 97 in the chart. Appropriate lettering adjacent the opening 97, e. g., Add-Lbs., serves to call the attention of the operator to the fact that the amount represented by the figures appearing in the opening must be added to the amount indicated by the indicator 24 on the chart 26. The arm 94 is pivotally connected to a rod 98 extending downwardly within the cabinet 1 and the rod 98 is coupled to a rod 99 (Figure II) larger in diameter coupled in turn at 100 to the slidably mounted rack 74.

The unit weight indicating device 59 includes a drum 101 bearing a series of numerals which may represent tare values offset by unit weights 27. The drum 101 is mounted for rotation between the legs of a U-shaped bracket 102 (Figure VI) and is driven by a cord drive which includes a cable 103 running over an idler 104 and a drive pulley 105 to which the drum 101 is attached. One end of the cable 103 is resiliently fastened to a bracket 106 fixed to the stationary plate 62 and the other end is fastened to the bracket 107 carried by the slidably mounted rack 73 by means of a zero adjusting thumb screw 108. The drum 101 is positioned immediately in back of a cover 109 (Figure I) so that one of the series of numerals thereon is visible in an opening 110 in the cover. Appropriate lettering adjacent the opening 110, e. g., Add-Lbs., serves to call the attention of the operator to the fact that the amount represented by the figures appearing in the opening must be added to the amount indicated by the poise weights 13 and 14 on the tare beams 11 and 12. Zero adjustment of the drum 101 is effected by turning the thumb screw 108 which pulls the cable 103 and extends a coil spring 111 that connects the cable to the bracket 106. This turns the drum 101 so that it may indicate zero when none of the unit weights 27 are being used for offsetting tare.

In the operation of the device, for example, if an empty truck weighs 2400 pounds, the operator manipulates the conditioning lever 86 into "Tare" position indicated at 93 in Figure I. A coil spring 112 connected between the shoulder screw 91 carried by the bracket 89 fixed to the shaft 87 and a pin 113 fixed to the stationary plate 62 tends to maintain the conditioning lever 86 in the position to which it is moved. The wheel 90 carried by the bracket 89 then forces the pivotally mounted rack 67 into engagement with the slidably mounted rack 73. This couples the rack 73 with the slide 64.

The operator then may use unit weights 27 to tare off 2000 pounds by cranking the handle 37 clockwise 360 degrees. Each time the handle 37 is turned clockwise 180 degrees the capacity of the scale is increased by a fixed amount equal to the capacity of the chart 26, which for the purpose of illustration is 1000 pounds. The operator may use the regular poise weights 13 and 14 to tare off the remaining 400 pounds. Each time the handle 37 is turned clockwise, the end of the bar 58, link connected with the slide 64, drives the slide and the slidable rack 73, now coupled to the slide, downward causing the cable 103 to turn the tare drum 101 which then displays the numerals "2000" in the opening 110 in the cover 109.

When the conditioning lever 86 was moved to "Tare" position 93, the wheel 90 moved away from the pivotally mounted rack 68 which was then urged out of engagement with the slidable rack 74 by the spring 72 so that the downward movement of the slide 64 had no effect on the rack 74, the shoulder screw 78 merely moving downward in the slot 77 in the rack 74. In this stage of the weighing cycle, the unit weight indicating device 60 indicates zero.

The operator then may manipulate the conditioning lever 86 into "Weigh" position indicated at 92 in Figure I. This positions the wheel 90, as shown in Figure VI, against the pivotally mounted rack 68 and away from the pivotally mounted rack 67. The rack 67 is then urged by the spring 72 out of engagement with its cooperating rack 73 and the rack 68 is then meshed with its cooperating rack 74. Further movement of the slide 64 has no effect on the rack 73 and the unit weight indicating device 59 driven thereby, the shoulder screw 78 merely moving in the slot 77 in the rack 73. It is to be understood that, when the racks 73 or 74 are driven by the slide 64, the slots 75 in the racks move relative to the shoulder screws 76, the coil springs 79 holding the racks 73 and 74 in place when such racks are uncoupled from the driving racks 67 and 68.

The operator then may use the remaining unit weights 27 to offset 7000 pounds of net load by further cranking the handle 37 clockwise. Each 180 degree clockwise turn of the handle 37 causes the bar 58 to drive the slide 64 and the slidable rack 74, now coupled to the slide, downward one step causing the flag 96 operatively and permanently connected to the rack 74 to move downward and, after seven 180 degree turns, display "7000" in the opening 97 in the chart 26. In addition to the part of the net load counterbalanced by the usual automatic load counterbalancing mechanism, such as springs or pendulums, the two unit weight indicating devices 59 and 60 will then read, respectively:

"Add 2000 lb." to the tare shown on the tare beam.
"Add 7000 lb." to the net load shown on the dial.

After the operator has completed the weighing, he must remove all unit weights 27 from net load offsetting use before he can remove any unit weights from tare offsetting use. This prevents a new weighing from being made when unit weights may be in net load offsetting use unnoticed by the operator. Means are provided for preventing unit weights from being removed from tare offsetting use until all unit weights are removed from net load offsetting use and the indicating device 60 indicates zero. Such means includes a trigger 114 mounted on a shoulder screw 115 attached to the stationary plate 62. When the conditioning lever 86 is in "Weigh" position 92 and when the slidable rack 74 is moved downward by the turning of the handle 37, a trigger operating pin 116 fixed to the rack moves away from contacting position with the trigger. This permits a coil spring 117, extending between the trigger 114 and the end of the pin 113 remote from the coil spring 112 attached to the pin 113, to pivot the trigger about the axis of the shoulder screw 115 to a position where a hook 118 on the trigger cooperates with a protuberance 119 on the bracket 89 locking the conditioning lever 86 in "Weigh" position 92. The pin 116 is shown in trigger operating position in Figure VII and in a position away from the trigger in Figure VI.

To remove the unit weights 27 from net load offsetting use, the operator cranks the handle 37 counterclockwise until the unit weight indicating device 60 indicates zero and the trigger operating pin 116 contacts the trigger 114. In such position, he can no longer turn the handle 37 counterclockwise. The pin 116 pivots the trigger about the axis of the shoulder screw 115 and the hook 118 assumes the position shown in Figure VII. He then may manipulate the unlocked conditioning lever 86 into "Tare" position 93 and he may then further turn the handle 37 counterclockwise to remove the remaining unit weights from tare offsetting use. Both of the unit weight indicating devices 59 and 60 then indicate zero.

The apparatus so far described provides for the selective coupling of the unit weight indicating devices to the unit weight operating mechanism, whereby one 59 of the devices indicates the amount of tare offset by unit weights 27 and the other 60 of the devices indicates the amount of net load offset by further unit weights. The apparatus may be easily modified, as illustrated in Figure X, so that one of the unit weight indicating devices indicates the gross amount of both tare and net load offset by unit weights and the other of the indicating devices indicates the amount of net load offset by unit weights.

In the embodiment of the invention hereinbefore described, the slidable mounted rack 73 has a lower slot 77 which cooperates with a shoulder 120 (Figure VIII) on the shoulder screw 78, the shoulder 120 being wider than the thickness of the rack 73 so that the slide 64 and the end of the shoulder are drawn together by a nut 121 turned on the shoulder screw which permits the rack 73 to be slidable on the shoulder. It is to be understood that the slidable connections of the racks 73 and 74 are identical and, hence, Figure VIII which shows the slidable connections between the rack 74 and the slide 64 is also illustrative of the slidable connection between the rack 73 and the slide.

The apparatus may be easily modified by the addition of a washer 122 (see Figure X) between the head of the shoulder screw 78 and the slidable rack 73. The washer 122 takes up enough room on the shoulder 120 of the shoulder screw so that the nut 121 draws the slide 64 and the rack 73 together fixing the rack to the slide instead of drawing the slide 64 and the end of the shoulder together permitting the rack 73 to be slidable on the shoulder, as shown in Figure VIII. In the modified apparatus, the slidable connection between the rack 74 and the slide 64 is unaltered. The rack 73 moves together at all times with the slide 64 so that the indicating device 59 indicates the gross amount of unit weights used in offsetting both tare and net weight. The washer 122, and the shoulder on the shoulder screw 78 provide means for permitting the optional use of the unit weight indicating devices 59 and 60 either to indicate on the device 59 the amount of tare offset by unit weights and on the device 60 the amount of net load offset by further unit weights (both racks 73 and 74 slidable on the slide 64—Figure VIII) or to indicate on the device 59 the gross amount of tare and net load offset by unit weights (rack 73 fixed to the slide 64 by means of the washer 122—Figure X) and on the device 60 the amount of net load offset by unit weights (rack 74 slidable on the slide 64).

The unit weight indicating devices 59 and 60 may be coupled to the end of the bar 58 by means, generally indicated by the reference numeral 61a (Figure XI), for permitting the selective use of the unit weights 27 either to offset tare or to offset net load or both. Such means 61a is a modification of the preferred embodiment of the invention and includes a pair of slidably mounted racks 73a and 74a held in place by shoulder screws 76a and 78a in a manner similar to the way in which the racks 73 and 74 are mounted, as hereinbefore described. In the modified device, a bar 58a corresponding to the bar 58, hereinbefore described, which is driven downward in an arcuate path by the flash drive cams 46 as unit weights 27 are placed by the unit weight operating mechanism onto the hanger bar 29 and upward in an arcuate path as unit weights are removed from the hanger bar, carries a pinion 123 that is mounted for rotation in a slot 124 in the bar 58a and that is in constant mesh with the racks. When the end of the bar 58a moves up or down, the pinion 123 moves back or forth in the slot 124 and also vertically up or down and rolls up or down the slidably mounted racks 73a and 74a, if the racks are locked in place, or drives the racks 73a and 74a up or down when the racks are unlocked.

The slidable racks 73a and 74a are locked by means of a lock 125 which cooperates either with one or the other of the racks. The lock 125 is moved horizontally in stationary guides 126 by a conditioning lever 86a that is rockable about an axis of rotation indicated at 127 and that is connected to the lock by means of a leaf spring 128 which is fixed to the lock and which has a lower end extending through a hole 129 in the lever. When the conditioning lever 86a is rocked to the right, as viewed in Figure XI, one end of the lock may enter a notch 130 in the rack 74a and when the conditioning lever is rocked to the left the other end of the lock may mesh with several of the teeth on the rack 73a.

In the operation of the device, the operator rocks the conditioning lever 86a into "Tare" position indicated by the right hand position of the lever which is shown in Figure XI. This moves the right end of the lock 125 into the notch 130 preventing movement of the rack 74a and the left end of the lock away from the rack 73a permitting up and down movement of the rack 73a. The operator then may use unit weights 27 to tare off, for example, 2000 pounds by cranking the handle 37 clockwise 360 degrees and he may use the regular poise weights 13 and 14 to tare off any remaining tare that is less than 1000 pounds. Each time the handle 37 is turned clockwise 180 degrees the end of the bar 58a drives the pinion 123 downward which pinion rolls down the now locked rack 74a and drives the slidable rack 73a downward. A cable 103a attached to the rack 73a turns a tare drum corresponding to the drum 101, hereinbefore described, which then displays the numerals "2000."

The operator then may manipulate the conditioning lever 86a into "Weigh" position which is that position which is the same number of degrees to the left of vertical as the number of degrees to the right of vertical that the conditioning lever is shown in in Figure XI. This moves the right end of the lock 125 out of engagement with the notch 130 permitting up and down movement of the rack 74a and the left end of the lock into mesh with teeth on the rack 73a preventing further up and down movement of the rack 73a.

The operator then may use the remaining unit weights 27 to offset 7000 pounds of net load by further cranking the handle 37 clockwise. Each 180 degree clockwise turn of the handle 37 causes the bar 58 to drive the pinion 123 downward which pinion rolls down the now locked rack 73a and drives the unlocked slidable rack 74a downward. The rack 73a operates an indicating device which is the same and which is operated the same as the indicating device 60 hereinbefore described. In addition to the part of the net load counterbalanced by the usual automatic load counterbalancing mechanism, the two unit weight indicating devices will then read, respectively:

"Add 2000 lb." to the tare shown on the tare beam.
"Add 7000 lb." to the net load shown on the dial.

After the operator has completed the weighing, he must remove all unit weights 27 from net load offsetting use before he can remove any unit weights from tare offsetting use. This is automatically accomplished by the lock 125. When the pinion 123 drove the rack 74a downward, the notch 130 moved down away from its normal position opposite to the lock 125. The operator, therefore, cannot rock the conditioning lever into "Tare" position until he has cranked the handle 37 counterclockwise until all of the unit weights 27 are removed from net load offsetting use. The notch 130 then will have moved upward to its normal position opposite to the lock 125 and the bottoms of the slots 75a and 77a in the rack 74a are against the shoulder screws 76a and 78a respectively preventing further upward movement of the rack. If the leaf spring 128 is very stiff, the operator will not be able to turn the handle 37 further because the shoulder screws 76a and 78a stop the rack 74a and the lock 125 is in mesh with teeth of the rack 73a.

To remove the unit weights 27 from net load offsetting use, the operator rocks the conditioning lever 86a to the right releasing the rack 73a. He then cranks the handle 37 counterclockwise as far as it will go. Both of the unit weight indicating devices then indicate zero.

The apparatus so far described provides for the selective coupling of the unit weight indicating devices to the unit weight operating mechanism, whereby one of the devices indicates the amount of tare offset by unit weights and the other of the devices indicates the amount of net load offset by further unit weights. The apparatus may be easily modified by attaching the cable 103a to the end of the 58a as indicated by the arrow labeled "Gross" in Figure XI. The unit weight indicating device driven by the cable 103a may then be made to indicate the gross amount of both tare and net load offset by unit weights and the other of the indicating devices driven by the slidable rack 74a will indicate the amount of net load offset by unit weights.

If the leaf spring 128 is chosen weak enough, when the operator has removed all of the unit weights from net load offsetting use and the shoulder screws 76a and 78a prevent further upward movement of the rack 74a, he may continue to turn the handle 37 counterclockwise, since the upwardly directed force urging the rack 73a will cam the left end of the lock 125 out of engagement with the teeth of the rack 73a and drive the rack 73a upward. Thus, by the selection of a leaf spring 128 having the proper stiffness means are provided for permitting all unit weights to be removed from offsetting use and both of the indicating devices to be returned to zero position regardless of which position the lock 125 is in.

It will, of course, be understood that various details of construction may be varied over a wide range without departing from the principles of the invention, and it is therefore not the purpose to limit the patent granted hereon otherwise than necessitated by the scope of the appended claims.

Having described the invention, I claim:

1. In a weighing scale, in combination, means including unit weights for offsetting tare and net load, mechanism for positioning the unit weights to selectively change the load offsetting capacity of said means, indicating devices, and means for selectively coupling the indicating devices to the mechanism, whereby the devices are driven by the mechanism and one of the devices indicates the amount of tare offset by unit weights and the other one of the devices indicates the amount of net load offset by further unit weights.

2. In a weighing scale, in combination, means including unit weights for offsetting tare and net load, mechanism for positioning the unit weights to selectively change the load offsetting capacity of said means, a first indicating device permanently coupled to the mechanism, a second indicating device, and means for selectively coupling the second indicating device to the mechanism, whereby the devices are driven by the mechanism and the first device indicates the gross amount of tare and net load offset by unit weights and the second device indicates the amount of net load offset by unit weights.

3. In a weighing scale, in combination, means including unit weights for offsetting tare and net load, mechanism for positioning the unit weights to selectively change the load offsetting capacity of said means, indicating devices, means for selectively coupling the indicating devices to the mechanism, whereby the devices are driven by the mechanism and one of the devices indicates the amount of tare offset by unit weights and the other one of the devices indicates the amount of net load offset by further unit weights, and means for preventing unit weights from being removed from tare offsetting use until all of the unit weights are removed from net load offsetting use and the indicating device which indicates the amount of net load offset by unit weights indicates zero.

4. In a weighing scale, in combination, means including unit weights for offsetting tare and net load, mechanism for positioning the unit weights to selectively change the load offsetting capacity of said means, a slidably mounted plate operatively connected to the mechanism and positioned thereby, a pair of racks carried by the plate, and a pair of unit weight indicating devices selectively coupled one to one of the racks and the other to the other of the racks, one of the devices indicating the amount of tare offset by unit weights and the other of the devices indicating the amount of net load offset by further unit weights.

5. In a weighing scale, in combination, means including unit weights for offsetting tare and net load, mechanism for positioning the unit weights to selectively change the load offsetting capacity of said means, a slidably mounted plate operatively connected to the mechanism and positioned thereby, a rack carried by the plate, a first indicating device coupled to the plate, a second indicating device, and means for selectively coupling the second indicating device to the rack whereby the devices are driven by the mechanism and the first device indicates the gross amount of tare and net load offset by unit weights and the second device indicates the amount of net load offset by unit weights.

6. In a weighing scale, in combination, means including unit weights for offsetting tare and net load, mechanism for positioning the unit weights to selectively change the load offsetting capacity of said means, a slidably mounted plate operatively connected to the mechanism and positioned thereby, a pair of racks carried by the plate, a pair of unit weight indicating devices selectively coupled one to one of the racks and the other to the other of the racks, one of the devices indicating the amount of tare offset by unit weights and the other of the devices indicating the amount of net load offset by further unit weights, and means for preventing unit weights from being removed from tare offsetting use until all of the unit weights are removed from net load offsetting use and the indicating device which indicates the amount of net load offset by unit weights indicates zero.

7. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, unit weight indicating devices, and means for selectively coupling the indicating devices to the mechanism, whereby the devices are driven by the mechanism and one of the devices indicates the amount of tare offset by unit weights and the other one of the devices indicates the amount of net load offset by further unit weights.

8. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a first unit weight indicating device coupled to the mechanism, a second unit weight indicating device, and means for selectively coupling the second unit weight indicating device to the mechanism, whereby the devices are driven by the mechanism and the first device indicates the gross amount of tare and net load offset by unit weights and the second unit weight device indicates the amount of net load offset by unit weights.

9. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, unit weight indicating devices, means for selectively coupling the indicating devices to the mechanism, whereby the devices are driven by the mechanism and one of the devices indicates the amount of tare offset by unit weights and the other one of the devices indicates the amount of net load offset by further unit weights, and means for preventing unit weights from being removed from tare offsetting use until all of the unit weights are removed from net load offsetting use and the indicating device which indicates the amount of net load offset by unit weights indicates zero.

10. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a slidably mounted plate operatively connected to the mechanism and positioned thereby, a pair of racks carried by the plate, and a pair of unit weight indicating devices selectively coupled one to one of the racks and the other to the other of the racks, one of the devices indicating the amount of tare offset by unit weights and the other of the devices indicating the amount of net load offset by further unit weights.

11. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a slidably mounted plate operatively connected to the mechanism and positioned thereby, a rack carried by the plate, a first indicating device coupled to the plate, a second indicating device, and means for selectively coupling the second indicating device to the rack, whereby the devices are driven by the mechcanism and the first device indicates the gross amount of tare and net load offset by unit weights and the second device indicates the amount of net load offset by unit weights.

12. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a slidably mounted plate operatively connected to the mechanism and positioned thereby, a pair of racks carried by the plate, a pair of unit weight indicating devices selectively coupled one to one of the racks and the other to the other of the racks, one of the devices indicating the amount of tare offset by unit weights and the other of the devices indicating the amount of net load offset by further unit weights, and means for preventing unit weights from being removed from tare offsetting use until all of the unit weights are removed from net load offsetting use and the indicating device which indicates the amount of net load offset by unit weights indicates zero.

13. In a weighing scale, in combination, means including unit weights for offsetting tare and net load, mechanism for positioning the unit weights to selectively change the load offsetting capacity of said means, a pinion operatively connected to the mechanism and positioned thereby, a pair of racks meshed with the pinion, a pair of unit weight indicating devices operatively connected one to one of the racks and the other to the other of the racks, and a lock that cooperates either with one or the other of the racks, whereby one of the devices indicates the amount of tare offset by unit weights and the other of the devices indicates the amount of net load offset by further unit weights, the lock preventing unit weights from being removed from tare offsetting use until all of the unit weights are removed from net load offsetting use and the indicating device which indicates the amount of net load offset by unit weights indicates zero.

14. The combination according to claim 13 wherein one of the devices is operatively connected to a rack and the other of the devices is operatively connected to the mechanism, whereby the device connected to the rack indicates the amount of net load offset by unit weights and the other device indicates the gross amount of tare and net load offset by unit weights.

References Cited in the file of this patent

UNITED STATES PATENTS

| | | |
|---|---|---|
| 1,210,204 | Reeves | Dec. 26, 1916 |
| 1,561,997 | Peuker | Nov. 17, 1925 |
| 1,665,722 | Timson | Apr. 10, 1926 |
| 2,085,345 | Tuttle | June 29, 1937 |
| 2,529,759 | Benson | Nov. 14, 1950 |
| 2,724,585 | Bradley et al. | Nov. 22, 1955 |

FOREIGN PATENTS

| | | |
|---|---|---|
| 682,567 | France | May 30, 1930 |
| 60,802 | Denmark | Apr. 12, 1943 |